(12) United States Patent
Calleri

(10) Patent No.: US 11,512,543 B2
(45) Date of Patent: Nov. 29, 2022

(54) METHOD FOR QUANTIFYING THE VOLUMETRIC FLOW RATE OF A FLOW OF A DRILLING MUD IN A FLOATING STRUCTURE FOR SUBSOIL DRILLING

(71) Applicant: Geolog S.r.l., San Giuliano Milanese (IT)

(72) Inventor: Antonio Calleri, San Giuliano Milanese (IT)

(73) Assignee: Geolog S.r.l., San Giuliano Milanese (IT)

( * ) Notice: Subject to any disclaimer, the term of this patent is extended or adjusted under 35 U.S.C. 154(b) by 198 days.

(21) Appl. No.: 17/009,801

(22) Filed: Sep. 2, 2020

(65) Prior Publication Data
US 2021/0079742 A1 Mar. 18, 2021

(30) Foreign Application Priority Data
Sep. 3, 2019 (IT) .......................... 102019000015440

(51) Int. Cl.
*E21B 21/08* (2006.01)
*E21B 21/00* (2006.01)
*G01F 1/60* (2006.01)
*G01F 1/84* (2006.01)

(52) U.S. Cl.
CPC ............ *E21B 21/08* (2013.01); *E21B 21/001* (2013.01); *G01F 1/60* (2013.01); *G01F 1/8436* (2013.01); *E21B 21/00* (2013.01); *E21B 21/082* (2020.05)

(58) Field of Classification Search
CPC ........ E21B 21/08; E21B 21/001; E21B 21/00; E21B 21/082; G01F 1/60; G01F 1/8436
See application file for complete search history.

(56) References Cited

U.S. PATENT DOCUMENTS 3,976,148 A * 8/1976 Maus ...................... E21B 21/08
 175/48
2019/0228777 A1* 7/2019 Papadimitriou .... G01M 5/0033

* cited by examiner

*Primary Examiner* — James G Sayre

(57) ABSTRACT

In a method for quantifying a volumetric flow rate of a flow of drilling mud in a floating structure for subsoil drilling, a flowmeter and a detection device are provided on a floating structure for subsoil drilling. The flowmeter generates a flow signal. The detection device generates a heave signal representative of a vertical heave of the floating structure. A processor transforms the flow signal into a first spectrum in the frequency domain and the heave signal into a second spectrum in the frequency domain. The processor compares the first spectrum with the second spectrum, obtaining a resultant spectrum. The processor transforms the resultant spectrum into a resultant signal in the time domain. The processor determines a mean value of the flow signal, adds the resultant signal to the mean value, obtaining a quantification of a flow of drilling mud in the floating structure.

20 Claims, 7 Drawing Sheets

METHOD FOR QUANTIFYING THE VOLUMETRIC FLOW RATE OF A FLOW OF A DRILLING MUD IN A FLOATING STRUCTURE FOR SUBSOIL DRILLING

RELATED APPLICATION

This application claims the benefit of priority of Italian Patent Application No. 102019000015440 filed on Sep. 3, 2019, the contents of which are incorporated herein by reference in their entirety.

FIELD AND BACKGROUND OF THE INVENTION

The present invention relates to a method for quantifying the volumetric flow rate of a flow of drilling mud in a floating structure for subsoil drilling.

When drilling an oil well (for locating and extracting hydrocarbons in the subsoil) or a geothermal well (for locating and exploiting geothermal resources), a fluid called drilling mud is made to circulate within the wellbore in order to lubricate and cool the drill bit. The drilling mud, which is taken from a source tank, is pumped into the hollow interior of the drill string and is made to flow back up to the surface within the annular space, called "annulus", defined between the drill string and the well wall. After having reached the surface, the returning mud flows, typically at atmospheric pressure, along a return tube, also known as "flow line", at the end of which the solid debris dragged by the mud is separated from the fluidic component by means of a system of vibrating sieves. The fluidic component of the mud is then fed back into the source tank.

The purpose of drilling mud circulation is, therefore, not only to lubricate and cool the drill bit, but also to convey to the surface the solid rocky debris, or "cuttings", and the fluidic products contained therein.

An additional function of the drilling mud is to support the already drilled part of the well. Thanks to the hydrostatic pressure exerted by the mud, it is possible to balance the pressure of the fluids contained in the rocky formations during the drilling. Without such countering action, the fluids contained in the rocky formations would flow uncontrollably in the well during the drilling. In particular, in "static" conditions, i.e. when no mud is made to circulate in the well, the pressure at the bottom of the well, known as "Bottom Hole Pressure" (BPH), equals the hydrostatic pressure, which essentially depends on the height and mean density of the mud column. In "dynamic" conditions, i.e. when mud is made to circulate in the well, the BHP value depends on the hydrostatic pressure of the mud and also on the load loss caused by the mud flowing back up along the annulus.

On drilling rigs, the returning mud flow is normally measured. This measurement can be used for several purposes, and particularly for detecting any fluid kicks and/or mud losses. The latter can be used for identifying any fractures.

Kicks occur when the BHP cannot balance the pressure of the fluids contained in the formation, resulting in unexpected and uncontrolled intake of amounts of fluid (e.g. hydrocarbon) in the drilling mud circuit.

A fracture is a crack or break occurring in the rock containing a hydrocarbon deposit, which has not been not caused by exfoliation or scaling phenomena. Fractures are typically found near reservoirs, i.e. the regions containing hydrocarbons.

Measuring the returning mud flow is particularly difficult on rigs using floating drilling structures, such as platforms or ships (also known as "drillships").

Floating structures are suitably connected to the fixed part of the rig, which is secured to the marine subsoil; this connection is effected, for example, by means of telescopic joints that allow the floating structure to follow the wavy motion of the water while remaining constrained to the fixed part of the rig.

The vertical drift of the floating structure disturbs the detection of the returning mud flow. Therefore, a direct measurement of such flow will not exactly correspond to the quantity of mud per time unit flowing up along the system, but will also include a noise component due to said drift of the floating structure.

The Applicant also observes that the noise caused by the drift of the floating structure has an amplitude that is typically similar to that of the real signal provided by a direct measurement of the mud flow. As a consequence, the measurements of the returning mud flow turn out to be strongly disturbed and hence unreliable.

The state of the art provides some solutions to this problem.

Such solutions include the application of a low-pass filter to the spectrum of the signal supplied by a flowmeter arranged along the mud path, typically near the flow line, once the mud has returned to the surface.

The Applicant observes, however, that a total elimination (or anyway a strong attenuation) of certain bands may imply the loss of useful information contained in spectral components at relatively high frequencies, i.e. frequencies higher than the cut-off frequency of the low-pass filter.

Moreover, the Applicant has verified that the use of a low-pass filter introduces a non-negligible delay in the analysis—which is extremely disadvantageous for kick detection, since kicks should be detected as soon as possible due to the potentially catastrophic nature thereof.

SUMMARY OF THE INVENTION

It is one object of the present invention to provide a method for precisely and accurately quantifying the volumetric flow rate of the flow of drilling mud in a floating structure for subsoil drilling.

It is a further object of the invention to provide a method that can dynamically adapt itself to variations occurring in the measurement context (e.g. due to the wavy motion of the water mass whereon the structure is floating).

These and other objects are substantially achieved by a method as set out in the appended claims.

BRIEF DESCRIPTION OF THE SEVERAL VIEWS OF THE DRAWINGS

Further features and advantages will become more apparent in the light of the following detailed description of a preferred, but non-limiting, embodiment of the invention. Such description is provided herein with reference to the annexed drawings, which are also supplied by way of non-limiting example, wherein.

Figure 1:
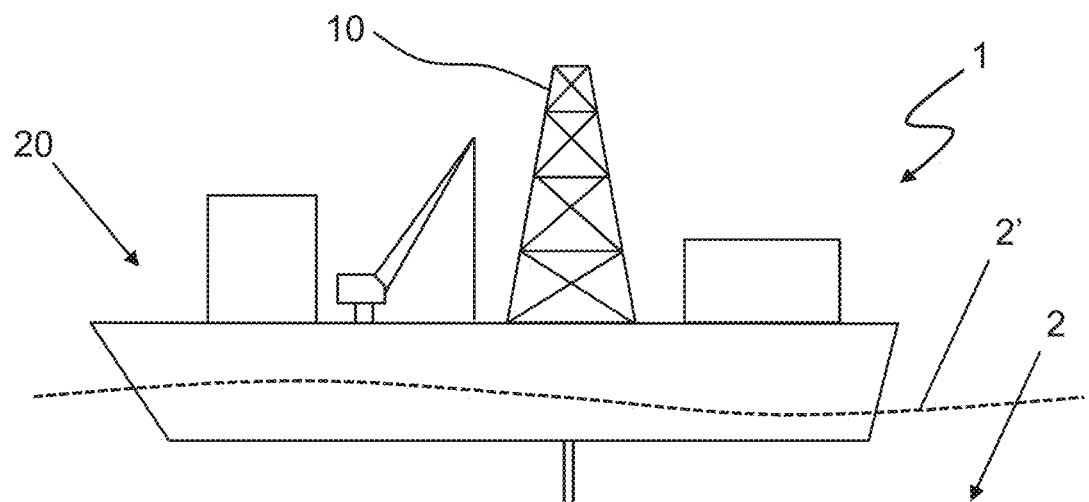
FIG. 1 schematically shows a rig whereon the invention can be implemented.
Figure 1:
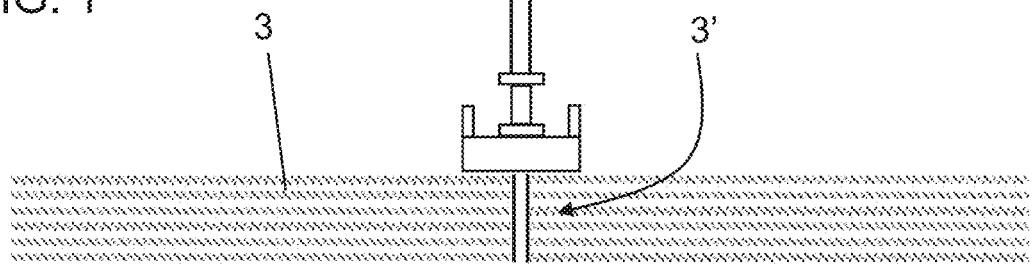

Reference numeral 1 designates as a whole a subsoil drilling rig whereon the present invention can be used.

DESCRIPTION OF SPECIFIC EMBODIMENTS OF THE INVENTION

The rig 1 (FIG. 1) comprises a supporting structure 10 and a motor mounted on such supporting structure. In particular, the motor may be constrained to the supporting structure 10 by means of a hook, which allows it to translate along a substantially vertical axis. The rotary motion generated by the motor is transferred to a drill bit via a rod structure. The rods consist of tubular sections with threaded ends which, being so assembled as to obtain a predefined longitudinal development, allow the drill bit to reach depths as low as a few thousands of meters while continuing to rotate about its own longitudinal axis.

The rig 1 also comprises a floating structure 20, whereon the supporting structure 10 is mounted.

The floating structure 20 is adapted to float on the sea/ocean water 2 above the seabed 3 where the area to be drilled 3' is located. Reference numeral 2' in FIG. 1 schematically designates the surface of said sea/ocean water 2.

The floating structure 20 may be, for example, a platform or a ship (respectively referred to as "semisub" and "drillship").

The floating structure 20 is connected to the area to be drilled 3' via a modular system of pipes 30, also known as "riser", within which the drill bit and the rods supported by the supporting structure 10 are driven. The modular system of pipes 30 allows the drilling mud to circulate from the well up to the surface, i.e. to the floating structure.

Reference numeral 40 designates a connection zone comprising a telescopic joint and suitable gaskets, which connects the fixed part of the rig (secured to the seabed in the area to be drilled 3') to that part of the rig which is substantially integral with the floating structure 20.

Note that in FIG. 1 the above-described elements are depicted in a schematic manner, without necessarily observing the actual proportions among the dimensions of such elements.

In order to effect the drilling, drilling mud is pumped into said rods and reaches the drill bit. Once it has reached the terminal part of the drill bit at a given pressure, the mud flows back up through the well, returning to the top opening located at the supporting structure 10.

For example, the drilling mud may consist of a base (water or oil) and chemical additives used for conditioning its physical and rheological characteristics.

In accordance with the invention, a method is provided for quantifying the volumetric flow rate of the flow of drilling mud going back up along the well and arriving at the floating structure 20.

A flowmeter 50 is provided on the floating structure. By way of example, the flowmeter 50 may be a Coriolis-effect flowmeter or a so-called electromagnetic flowmeter.

The flowmeter 50 generates a flow signal FS; the flow signal FS is representative of the volumetric flow rate of the flow of mud detected by the flowmeter 50.

The flow signal FS is defined in the time domain.

The flow signal FS is acquired by a processor 60.

The flow signal FS is preferably acquired in a first time interval T1.

From a practical viewpoint, the flow signal FS is detected with substantial continuity, preferably by sampling it at a predetermined frequency (e.g. once per second). The processor 60 acquires a set of samples belonging to a specific time interval, i.e. the first time interval T1. The first time interval T1 may have a duration comprised, for example, between 30 seconds and 120 seconds. The use of a buffer is envisaged, into which the set of the last samples—corresponding to a time duration equal to the first time interval T1—is stored, so that it can then be processed by the processor 60.

Figure 3:
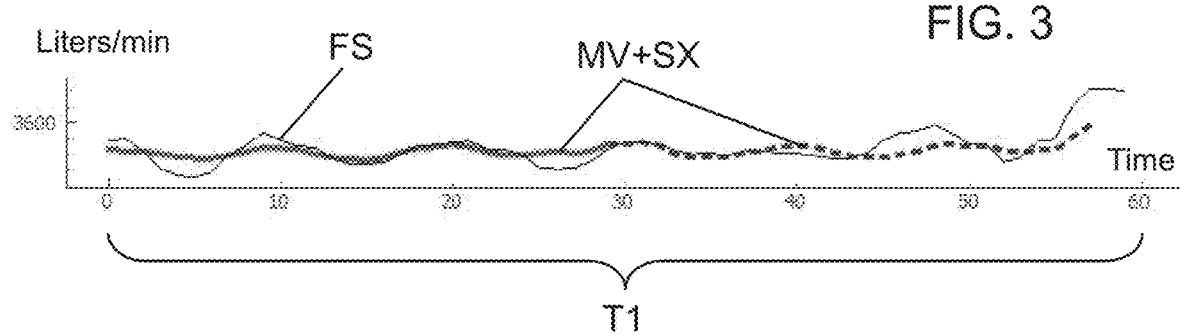
FIGS. 3, 4, 5, 6 and 7 show some graphs of quantities used in the present invention.

The flow signal FS and the first time interval T1 are schematically represented in FIG. 3.

For example, the processor 60 may be a part of, or be implemented as, a conventional PC or another electronic device programmed/configured for executing the steps that will be described below.

On the floating structure 20 a detection device 70 is provided, which is configured for generating a heave signal HS representative of a substantially vertical heave of the floating structure.

Advantageously, the detection device 70 comprises an accelerometer. In particular, the floating structure 20 is equipped with a so-called Motion Reference Unit (MRU) comprising an accelerometer and dedicated software, so that the movement of the accelerometer can be detected with respect to the sea surface—and not with respect to the floating structure 20.

The heave signal HS is defined in the time domain.

The heave signal HS is acquired by the processor 60.

The heave signal HS is acquired in a second time interval T2.

From a practical viewpoint, the heave signal HS is detected with substantial continuity, preferably by sampling it at a predetermined frequency (e.g. once per second). The processor 60 acquires a set of samples belonging to a specific time interval, i.e. the second time interval T2. The second time interval T2 may have a duration comprised, for example, between 30 seconds and 120 seconds. The use of a buffer is envisaged, into which the set of the last samples—corresponding to a time duration equal to the second time interval T2—is stored, so that it can then be processed by the processor 60.

Figure 4:
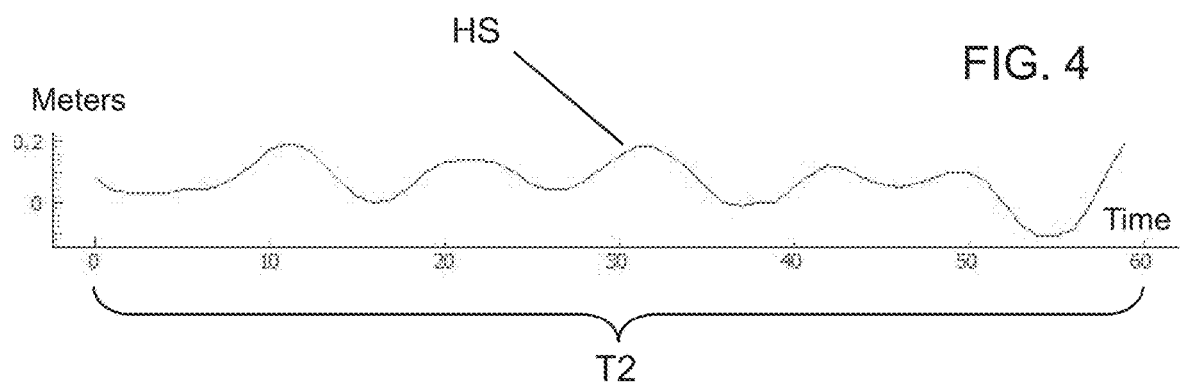

The heave signal HS and the second time interval T2 are schematically represented in FIG. 4.

Figure 2:
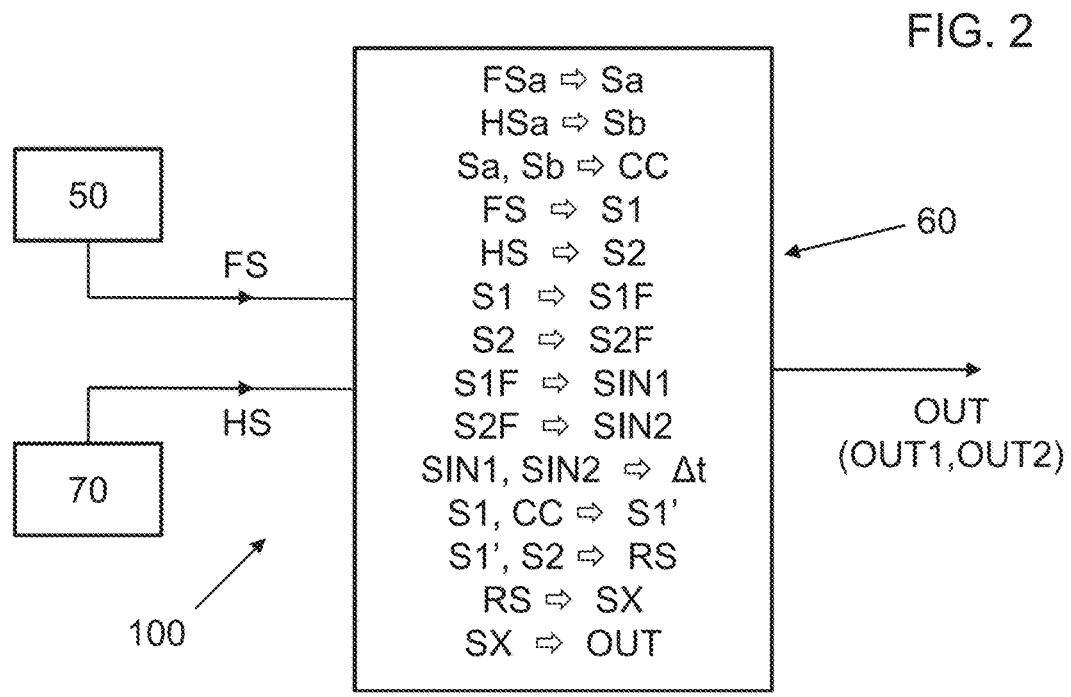
FIG. 2 shows a block diagram of a system suitable for implementing the method according to the invention.

Preferably, the flowmeter 50, the detection device 70 and the processor 60 constitute an apparatus 100 for quantifying the volumetric flow rate of a flow of drilling mud in a floating structure for subsoil drilling. Such apparatus 100 is schematically shown in FIG. 2.

Preferably, the first time interval T1 has substantially the same duration as the second time interval T2.

Upon activation of the system, the first time interval T1 and the second time interval T2 substantially coincide, i.e. they have the same start time. As will become more apparent below, during the operation of the rig an offset between the two intervals—and hence between the acquired portions of the two signals—will be introduced.

Figure 5:
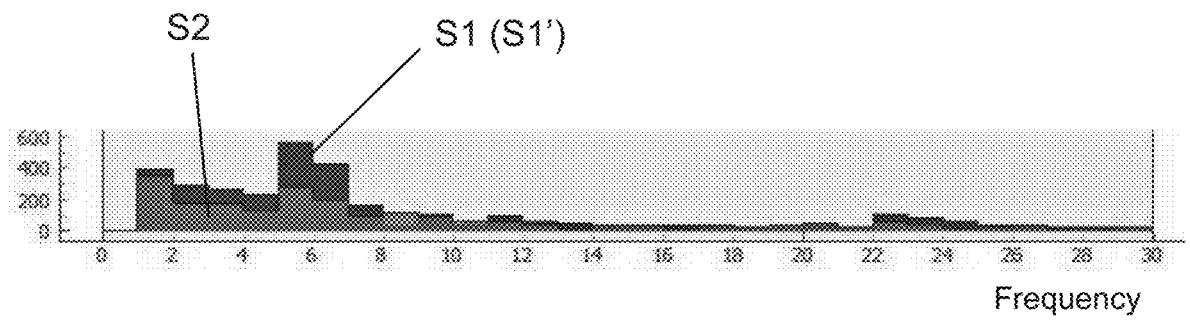

The processor 60 executes a transform, e.g. a Fast Fourier Transform (FFT), in order to transform the flow signal FS from the time domain to the frequency domain. A first spectrum S1 in the frequency domain is thus obtained (FIG. 5).

The first spectrum S1 develops in a frequency interval. More in particular, the first spectrum S1 initially comprises a continuous component, i.e. at zero frequency (corresponding to the mean value of the flow signal FS), and various components at higher frequencies.

The Applicant observes that frequencies up to 50 Hz may preferably be considered, although from a practical viewpoint frequencies up to 1 Hz may suffice.

Preferably, the continuous component is set to zero, or anyway ignored, during the comparison that will be described below.

Preferably, the mean value MV of the flow signal FS is stored into a memory area associated with the processor 60.

The processor 60 executes a transform, e.g. a Fast Fourier Transform (FFT), in order to transform the heave signal HS from the time domain to the frequency domain. A second spectrum S2 in the frequency domain is thus obtained (FIG. 5).

Preferably, the second spectrum S2 develops in substantially the same frequency interval indicated above with reference to the first spectrum S1.

In order to determine the offset $\Delta t$ to be applied between the flow signal FS and the heave signal HS, the processor 60 identifies a reference frequency. Such reference frequency may preferably be selected, for example, among those frequencies where the first spectrum S1 and the second spectrum S2 have the highest, or most significant, values.

The processor 60 executes filtering operations in order to filter the first spectrum S1 and the second spectrum S2 at the reference frequency, thereby obtaining a first filtered spectrum S1F and a second filtered spectrum S2F, respectively.

Figure 7:
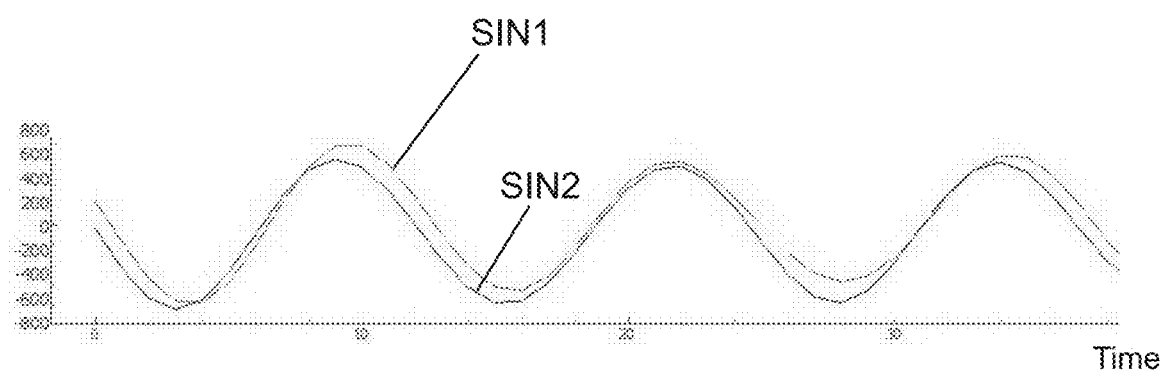

The processor 60 then transforms the first filtered spectrum S1F and the second filtered spectrum S2F from the frequency domain to the time domain, e.g. by means of an Inverse Fast Fourier Transform (IFFT), thereby obtaining a first sinusoidal signal SIN1 and a second sinusoidal signal SIN2, respectively (FIG. 7).

The determined time offset $\Delta t$, i.e. the offset to be applied between the flow signal FS and the heave signal HS, is computed as a function of an offset between the first sinusoidal signal SIN1 and the second sinusoidal signal SIN2.

In practical terms, the offset between the first sinusoidal signal SIN1 and the second sinusoidal signal SIN2 is determined and then applied between the flow signal FS and the heave signal HS.

In this manner, the acquired portion of the flow signal FS and the acquired portion of the heave signal HS are aligned in time.

Figure 11:
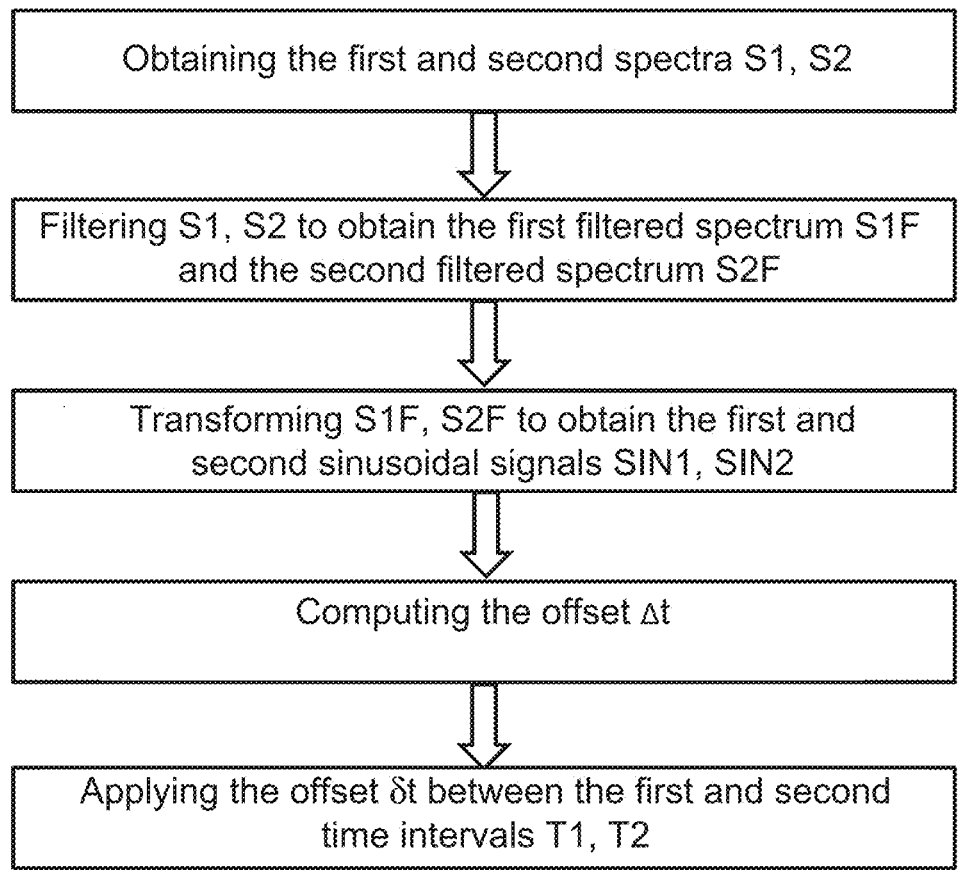

The steps carried out for computing the time offset $\Delta t$ are schematically represented in the flow chart of FIG. 11.

The processor 60 preferably provides for executing an adjustment phase. Essentially, the purpose of such phase is to make the amplitudes of the first spectrum S1 comparable with those of the second spectrum S2.

More in detail, the processor 60 takes a plurality of comparison coefficients CC from a memory associated with the processor 60 itself, and applies such comparison coefficients CC to the first spectrum S1 or to the second spectrum S2.

Each comparison coefficient CC is associated with a respective frequency band; the application of the comparison coefficients to the first spectrum S1 or to the second spectrum S2 is effected by applying (e.g. multiplication) each comparison coefficient CC to the values of the spectrum (as aforesaid, the first or second spectrum S1, S2) belonging to the frequency band associated with that comparison coefficient CC.

Preferably, the comparison coefficients CC may be determined during a setup phase.

In particular, during the setup phase a first detection signal FSa, representative of a volumetric flow rate of the drilling mud in the floating structure 20, is detected by means of the flowmeter in a third time interval T3. In practical terms, the first detection signal FSa is wholly similar to the above-mentioned flow signal FS, the only difference between the two being that they are detected in different time intervals. Preferably, the third time interval T3 precedes the first time interval T1.

During the setup phase a second detection signal HSa, representative of a substantially vertical heave of the floating structure 20, is detected by means of the detection device 70 in a fourth time interval T4. In practical terms, the second detection signal HSa is wholly similar to the above-mentioned heave signal HS, the only difference between the two being that they are detected in different time intervals. Preferably, the fourth time interval T4 precedes the second time interval T2.

During the setup phase, the processor 60 is activated in order to transform the first detection signal FSa into the frequency domain, thereby obtaining a corresponding first spectral signal Sa, and to transform the second detection signal HSa into the frequency domain, thereby obtaining a corresponding second spectral signal Sb.

Once a frequency interval has been identified in which the first spectral signal Sa and the second spectral signal Sb develop, the processor 60 subdivides such frequency interval into a plurality of frequency bands. In each one of said frequency bands, the processor 60 compares the first spectral signal Sa with the second spectral signal Sb, thereby obtaining, for each frequency band, a respective comparison coefficient CC.

By way of example, the comparison between the first spectral signal Sa and the second spectral signal Sb in each frequency band may envisage the computation of a ratio between the values taken by the first spectral signal Sa in each frequency band and the corresponding values taken by the second spectral signal Sb in the same frequency bands.

The comparison coefficients CC are then stored into a memory associated with the processor 60, to be then used, as aforesaid, in the adjustment phase.

Preferably, the third time interval T3 and the fourth time interval T4 are identified during an initial phase, when mud flow variations are only, or mostly, caused by the vertical fluctuations of the floating structure. For example, it is envisaged that said initial phase may be carried out prior to starting the actual drilling phase, during which the first and second time intervals T1, T2 are identified.

Figure 10:
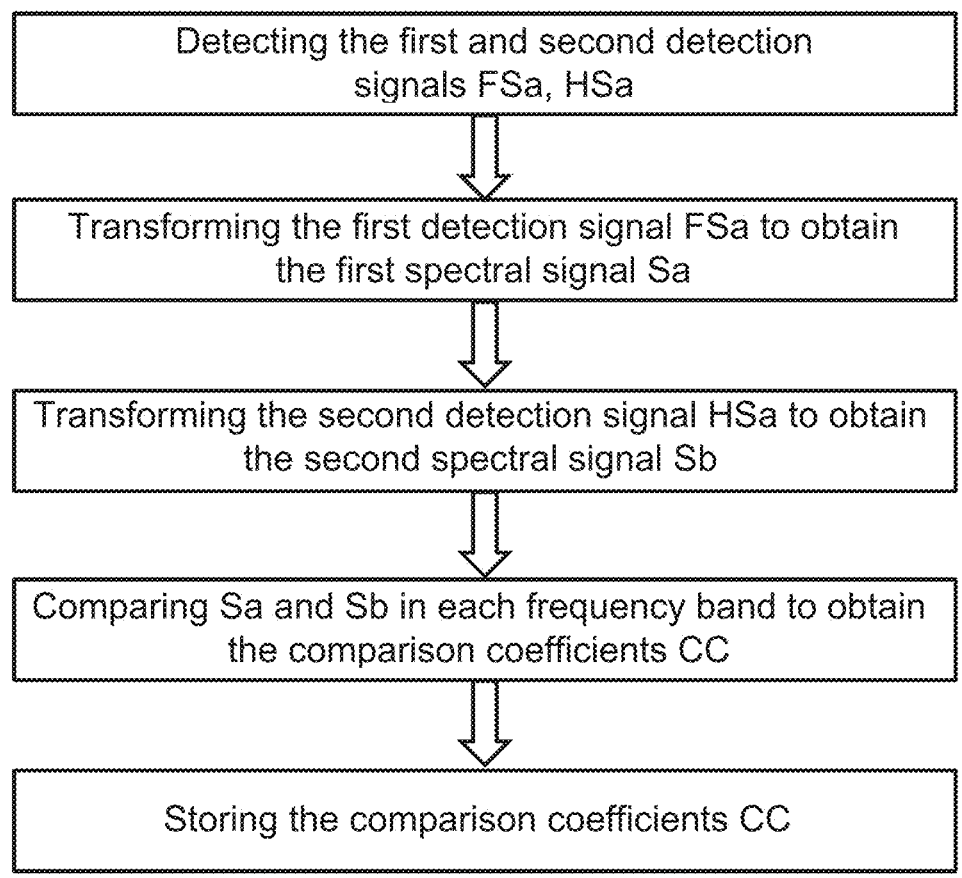

The operations performed during the initial phase for computing the comparison coefficients CC are schematically represented in the flow chart of FIG. 10.

Preferably, a time difference $\Delta t'$ may be introduced between the third time interval T3 and the fourth time interval T4.

The time difference $\Delta t'$ may be computed, for example, by following a procedure similar to that previously described for the offset $\Delta t$ and schematically represented in the flow chart of FIG. 11, starting from the first and second spectral signals Sa, Sb instead of the first and second spectra S1, S2.

Referring back to the comparison between the first spectrum S1 and the second spectrum S2, which is aimed at obtaining the resultant spectrum RS, such comparison may be made by making a subtraction between the first spectrum S1 and the second spectrum S2 after the comparison coefficients CC have been applied to the first or second spectrum S1, S2.

Merely by way of example, the following will consider the case wherein the comparison coefficients CC have been applied to the first spectrum S1, indicating as S1' the first spectrum after the application of the adjustment coefficient.

Note that the invention can be implemented in much the same (dual) way by applying suitably computed comparison coefficients to the second spectrum rather than to the first spectrum.

Figure 6:
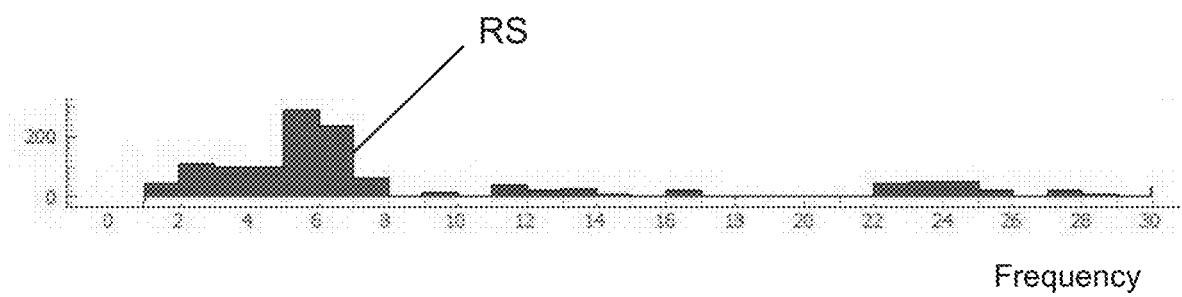

In accordance with the invention, the processor 60 makes a comparison between the first spectrum S1 (possibly after the adjustment phase, thus considering the spectrum S1') and the second spectrum, thereby obtaining a resultant spectrum RS (FIG. 6).

The resultant spectrum RS can be obtained by making a subtraction between the first spectrum S1 (or S1') and the second spectrum S2. In particular, it is envisaged that, when the subtraction result is negative, the value of the resultant spectrum RS will be set to zero.

The processor 60 then executes a transform (e.g. IFFT) in order to transform the resultant spectrum RS from the frequency domain to the time domain, thereby obtaining a corresponding resultant signal SX.

From a practical viewpoint, the resultant signal SX represents the trend over time of the volumetric flow rate of the returning mud flow, with respect to the mean value of such flow, without the noise contribution given by the vertical heave of the floating structure 20.

The processor 60 is configured for computing the mean value MV of the flow signal FS, i.e. the mean value of the volumetric flow rate of the mud flow measured by the flowmeter 50 in the time interval considered.

Such mean value is added to the resultant signal SX, thereby obtaining a quantification or estimate of the volumetric flow rate of the returning mud flow. The sum of the mean value MV and the resultant signal SX is schematically represented in FIG. 3 as MV+SX. The processor 60 then generates an output signal OUT incorporating said quantification.

The output signal OUT may be sent, for example, to a visualization device, so as to allow an operator to watch the progress of the mud flow over time.

Additionally or alternatively, the output signal OUT may be stored into a suitable memory area associated with the processor 60, so that it can be used in subsequent processing steps for statistical and/or monitoring purposes.

Additionally or alternatively, the output signal OUT is used for computing the mud flow difference over time. This difference may then be compared with reference or threshold values, in order to verify if the flow is substantially constant over time or at least remains within predefined intervals. In case of excessive variations, an audible and/or visual alarm signal may be generated, since such variations may indicate kicks or fractured regions.

Figure 9:
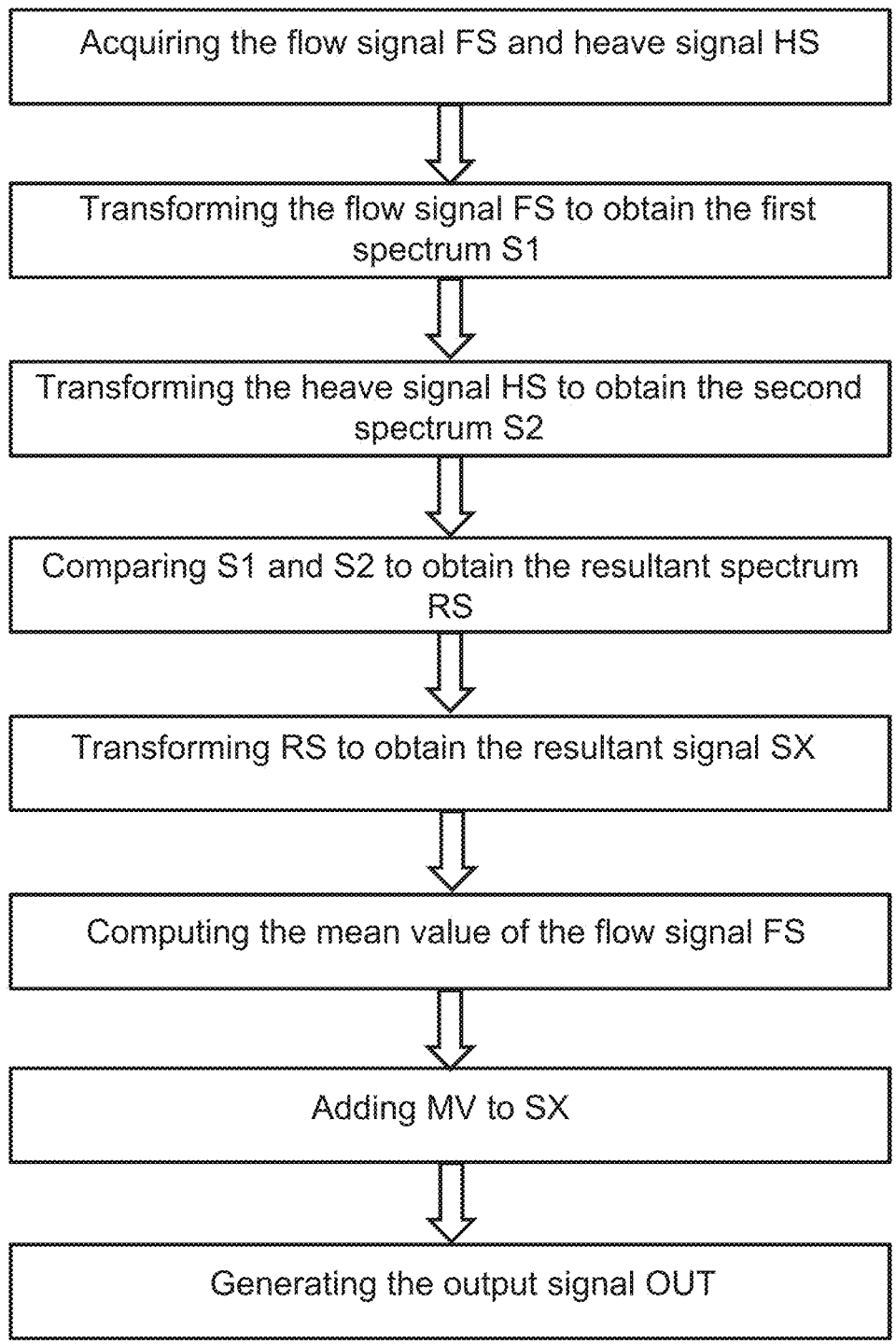
FIGS. 9, 10 and 11 are flow charts representative of steps carried out in some embodiments of the method according to the present invention.

The steps carried out in order to obtain the output signal OUT are summarized in the flow chart of FIG. 9.

In one embodiment it is envisaged that the processor 60 outputs two different results, i.e. a first result OUT1 and a second result OUT2.

The first result OUT1 is representative of the quantification of the volumetric flow rate of drilling mud computed at a time instant delayed by 5 to 10 seconds from the "present time", i.e. from the instant when the computation is made.

The second result OUT2 is representative of the quantification of the volumetric flow rate of the flow of drilling mud computed at a time instant delayed by 25 to 35 seconds from the "present time", i.e. from the instant when the computation is made.

In practical terms, the processor 60 computes continuously (e.g. at a given frequency of approximately once per second) an estimate of the last 60 seconds of the volumetric flow rate of the flow of drilling mud. In FIG. 3, this is represented by the signal MV+SX (i.e. the curve given by the sum of the mean value MV of the flow signal FS and the resultant signal SX), wherein the rightmost point, with abscissa "60", is the instant that is closest to the present time, i.e. substantially the current time; the leftmost point, with abscissa "0", is the farthest instant, substantially corresponding to 60 seconds before the current time. The first result OUT1 is obtained by considering the value of the signal MV+SX at an instant 5-10 seconds before the current time. The second result OUT2 is obtained by considering the value of the signal MV+SX at an instant 25-35 seconds before the current time.

The first result OUT1, although less precise, can be obtained with less delay (as aforesaid, approximately 5-10 seconds), and may be useful for detecting any kicks in a sufficiently short time.

The second result OUT2, which is more precise but can only be obtained with a longer delay (as aforesaid, 25-35 seconds), permits more refined analyses, e.g. concerning the presence of any fractured regions.

Note that the above-described procedure is preferably carried out with substantial continuity: once the activity of the rig 1 has begun, the mud flow is continuously detected by the flowmeter 50, and the oscillations of the floating structure 20 are continuously detected by the detection device (accelerometer) 70. Also the offset Δt to be imposed between the first time interval T1 and the second time interval T2 is computed continuously (or with a certain periodicity), so as to verify that the offset initially/previously computed is still correct. If not, the processor 60 may execute a correction procedure, wherein the applied offset is gradually modified so as to reach, within a few iterations, the new correct value.

Figure 8:
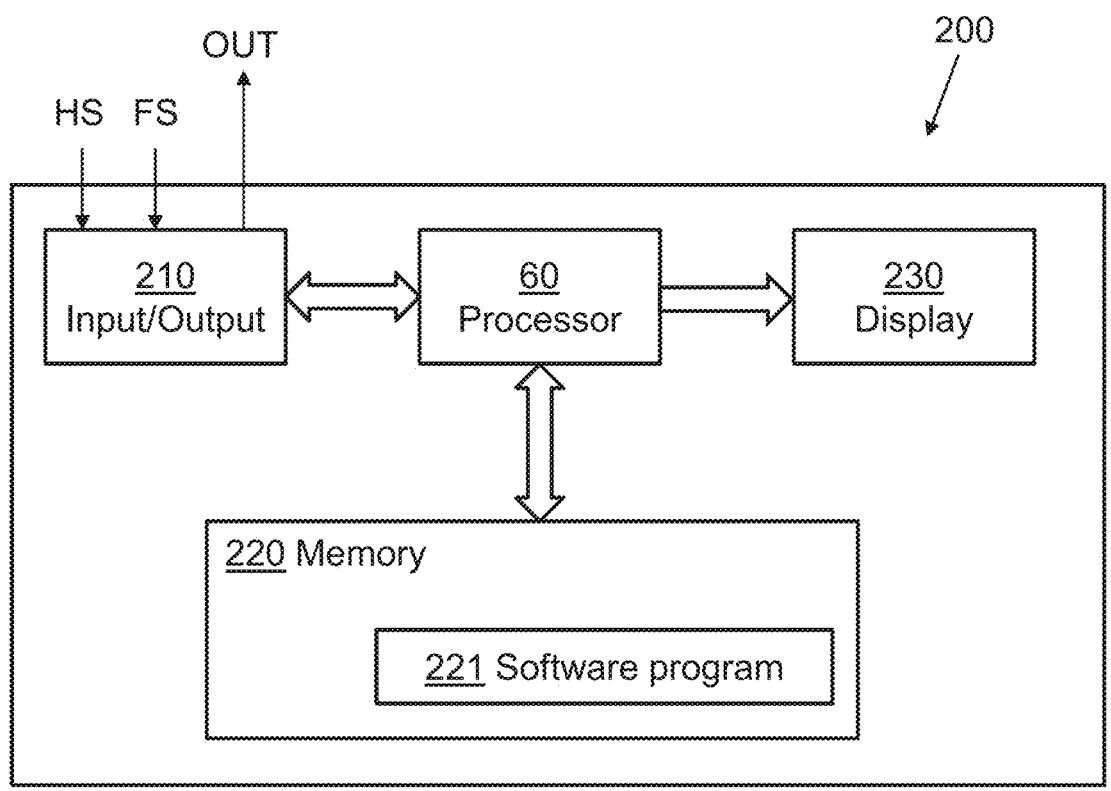
FIG. 8 shows an illustrative block diagram of an electronic device that may be used in order to implement the invention.

FIG. 8 shows, by way of example, an electronic device 200, e.g. a computer or a similar apparatus, configured for performing the processing envisaged by the method in accordance with the present invention. The electronic device 200 is equipped with an input/output device 210, which is used for reading the flow signal FS and the heave signal HS. The electronic device 200 also includes the processor 60, possibly implemented as a microprocessor, the functional characteristics of which have already been described herein. The electronic device 200 may include a non-volatile memory 220 storing, for example, the flow signal FS, the heave signal HS, the mean value MV of the flow signal FS, the comparison coefficients CC and the output signal OUT. The memory 220 can be used for storing a software program 221 comprising computer-readable instructions for obtaining the output signal OUT as a function of the flow signal FS and heave signal HS, as described above. The processor 60 is connected to the input/output device 210 and to the memory 220, and is used for executing the software program in order to obtain the output signal OUT, i.e. the quantification of the flow of drilling mud. The electronic device 200 may comprise the above-mentioned visualization device (reference numeral 230 in FIG. 8), e.g. a display, which may permit a user to display the output signal OUT and possibly other data generated/processed by the processor 60.

The invention attains important advantages.

First and foremost, the invention makes it possible to precisely and accurately quantify the volumetric flow rate of the flow of drilling mud in a floating structure for subsoil drilling.

The invention also allows the estimate to be dynamically adapted to variations occurring in the measurement context, e.g. due to the wavy motion of the water mass whereon the structure is floating.

What is claimed is:

1. Method for quantifying the volumetric flow rate of a flow of drilling mud in a floating structure for subsoil drilling, said method comprising:
   providing a flowmeter (50) on a floating structure (20) for subsoil drilling, said flowmeter (50) being configured for generating a flow signal (FS) defined in the time domain, said flow signal (FS) being representative of a volumetric flow rate of a flow of drilling mud in said floating structure (20);
   providing a detection device (70) on said floating structure (20), suitable for generating a heave signal (HS) defined in the time domain and representative of a substantially vertical heave of said floating structure (20);
   acquiring said flow signal (FS) and said heave signal (HS) through a processor (60);
   activating said processor (60) in order to transform said flow signal (FS), by applying a transformation that transforms signals in the time domain into the frequency domain, thereby obtaining a corresponding first spectrum (S1) in the frequency domain;
   activating said processor (60) in order to transform said heave signal (HS), by applying a transformation that transforms signals in the time domain into the frequency domain, thereby obtaining a corresponding second spectrum (S2) in the frequency domain;
   activating said processor (60) in order to compare said first spectrum (S1) with said second spectrum (S2), thereby obtaining a resultant spectrum (RS);
   activating said processor (60) in order to transform said resultant spectrum (RS), by applying a transformation that transforms spectra in the frequency domain into the time domain, thereby obtaining a corresponding resultant signal (SX) in the time domain;
   activating said processor (60) in order to:
      determine a mean value of said flow signal (FS);
      add said resultant signal (SX) to said mean value, thereby obtaining a quantification of the flow rate of the flow of drilling mud in said floating structure (20);
   activating said processor (60) in order to generate an output signal (OUT) representative of said quantification.

2. Method according to claim 1, wherein said detection device (70) comprises an accelerometer, said accelerometer generating said heave signal (HS).

3. Method according to claim 1, wherein the transformation applied to the flow signal is a Fast Fourier Transform.

4. Method according to claim 1, wherein the transformation applied to the heave signal is a Fast Fourier Transform.

5. Method according to claim 1, wherein said flow signal (FS) is acquired in a first time interval (T1), wherein said heave signal (HS) is acquired in a second time interval (T2), wherein said first time interval (T1) has substantially the same duration as said second time interval (T2).

6. Method according to claim 5, wherein said first time interval (T1) has a given time offset (Δt) with respect to said second time interval (T2).

7. Method according to claim 6, comprising activating said processor (60) in order to compute said given time offset (Δt) by executing the following steps:
   identifying a reference frequency;
   filtering said first spectrum (S1) at said reference frequency, thereby obtaining a first filtered spectrum (S1F);
   transforming said first filtered spectrum (S1F) into the time domain, by applying a transformation that transforms spectra in the frequency domain into the time domain, thereby obtaining a first sinusoidal signal (SIN1);
   filtering said second spectrum (S2) at said reference frequency, thereby obtaining a second filtered spectrum (S2F);
   transforming said second filtered spectrum (S2F) into the time domain, la applying a transformation that transforms spectra in the frequency domain into the time domain, thereby obtaining a second sinusoidal signal (SIN2);
   determining said given time offset (Δt) as a function of an offset between said first sinusoidal signal (SIN1) and said second sinusoidal signal (SIN2).

8. Method according to claim 7, wherein the transformation applied to the first filtered spectrum is an Inverse Fast Fourier Transform.

9. Method according to claim 7, wherein the transformation applied to the second filtered spectrum is an Inverse Fast Fourier Transform.

10. Method according to claim 1, wherein activating said processor (60) in order to compare said first spectrum (S1) with said second spectrum (S2) comprises activating said processor (60) in order to execute an adjustment phase comprising:
    taking a plurality of comparison coefficients (CC) from a memory associated with said processor (CC);
    applying said comparison coefficients (CC) to said first spectrum (S1) or to said second spectrum (S2).

11. Method according to claim 10, wherein said comparison coefficients (CC) are determined in a setup phase, said setup phase comprising:
    detecting, by means of said flowmeter (50), a first detection signal (FSa) defined in the time domain and representative of a volumetric flow rate of said drilling mud in said floating structure (20) in a third time interval (T3);
    detecting, by means of said detection device (70), a second detection signal (HSa) defined in the time domain and representative of a substantially vertical heave of said floating structure (20) in a fourth time interval (T4);
    activating said processor (60) in order to transform said first detection signal (FSa) into the frequency domain, by applying a transformation that transforms signals in the time domain into the frequency domain, thereby obtaining a corresponding first spectral signal (Sa);
    activating said processor (60) in order to transform said second detection signal (HSa) into the frequency domain, by applying a transformation that transforms signals from the time domain into the frequency domain, thereby obtaining a corresponding second spectral signal (Sb);

identifying a frequency interval in which said first spectral signal (Sa) and said second spectral signal (Sb) develop;

subdividing said frequency interval into a plurality of frequency bands;

in each one of said frequency bands, comparing said first spectral signal (Sa) with said second spectral signal (Sb), thereby obtaining, for each frequency band, a respective comparison coefficient (CC).

12. Method according to claim 11, wherein said third time interval (T3) and said fourth time interval (T4) precede said first time interval (T1) and said second time interval (T2).

13. Method according to claim 11, comprising imposing a time difference (Δt') between said third time interval (T3) and said fourth time interval (T4).

14. Method according to claim 11, wherein the transformation applied to the first detection signal and the second detection signal is a Fast Fourier Transform.

15. Method according to claim 10, wherein comparing said first spectrum (S1) with said second spectrum (S2) comprises making a subtraction between said first spectrum (S1) and said second spectrum (S2) after said comparison coefficients (CC) have been applied to said first spectrum (S1) or to said second spectrum (S2).

16. Method according to claim 1, wherein the transformation applied to the resultant spectrum is an Inverse Fast Fourier Transform.

17. Apparatus for quantifying the volumetric flow rate of a flow of drilling mud in a floating structure for subsoil drilling, said apparatus comprising:

a flowmeter (50) adapted to be positioned on a floating structure (20) for subsoil drilling, said flowmeter (50) being configured for generating a flow signal (FS), said flow signal (FS) being defined in the time domain and representative of a volumetric flow rate of a drilling mud in said floating structure (20);

a detection device (70) adapted to be positioned on said floating structure (20), said detection device (70) being configured for generating a heave signal (HS), said heave signal being defined in the time domain and representative of a substantially vertical heave of said floating structure (20);

a processor (60) configured for:

acquiring said flow signal (FS) and said heave signal (HS);

transforming said flow signal (FS), by applying a transformation that transforms signals in the time domain into the frequency domain, thereby obtaining a corresponding first spectrum (S1) in the frequency domain;

transforming said heave signal (HS), by applying a transformation that transforms signals in the time domain into the frequency domain, thereby obtaining a corresponding second spectrum (S2) in the frequency domain;

comparing said first spectrum (S1) with said second spectrum (S2), thereby obtaining a resultant spectrum (RS);

transforming said resultant spectrum (RS), by applying a transformation that transforms spectra in the frequency domain into the time domain, thereby obtaining a corresponding resultant signal (SX) in the time domain;

determining a mean value of said flow signal (FS);

adding said resultant signal (SX) to said mean value, thereby obtaining a quantification of the volumetric flow rate of a flow of drilling mud in said floating structure;

generating an output signal (OUT) representative of said quantification.

18. Apparatus according to claim 17, wherein the transformation applied to the flow signal is a Fast Fourier Transform.

19. Apparatus according to claim 17, wherein the transformation applied to the heave signal is a Fast Fourier Transform.

20. Apparatus according to claim 17, wherein the transformation applied to the resultant spectrum is an Inverse Fast Fourier Transform.

* * * * *